United States Patent [19]

Emerson et al.

[11] 4,421,496

[45] Dec. 20, 1983

[54] DRIVE COUPLING

[76] Inventors: Reginald S. Emerson, 34 Highlands Rd.; Norman Morris, 21 Poplars Rd., both of Buckingham, Buckinghamshire, England

[21] Appl. No.: 399,191

[22] Filed: Jul. 16, 1982

Related U.S. Application Data

[63] Continuation of Ser. No. 162,663, Jun. 24, 1980, abandoned.

[30] Foreign Application Priority Data

Jun. 29, 1979 [GB] United Kingdom ............... 7922650

[51] Int. Cl.³ ............................................... F16D 3/50
[52] U.S. Cl. ........................................ 464/95; 464/93; 464/99
[58] Field of Search ........................ 464/71, 72, 92, 93, 464/94, 95, 98, 99, 182; 403/1, DIG. 9

[56] References Cited

U.S. PATENT DOCUMENTS

| | | | |
|---|---|---|---|
| 1,246,445 | 11/1917 | Ludeman | 464/99 |
| 2,745,267 | 5/1956 | Hagenlocher | 464/99 X |
| 2,790,312 | 4/1957 | Hagenlocher et al. | 464/94 X |
| 2,932,255 | 4/1960 | Neukirch | 464/104 X |
| 3,229,480 | 1/1966 | Seigel et al. | 464/95 |
| 3,230,738 | 1/1966 | Seigel | 464/99 |
| 4,196,597 | 4/1980 | Robinson | 464/99 |
| 4,202,183 | 5/1980 | Fröhlich et al. | 464/154 |

FOREIGN PATENT DOCUMENTS 1083089  6/1960  Fed. Rep. of Germany .
857297   9/1940  France .

Primary Examiner—Stuart S. Levy
Assistant Examiner—Daniel P. Stodola
Attorney, Agent, or Firm—Berman, Aisenberg & Platt

[57] ABSTRACT

A drive coupling for connecting a drive shaft to a driven shaft, comprising a first flexible disc connected to one of the shafts, a second flexible disc, spaced-apart from the first flexible disc, two solid members each connected to at least a respective one of the flexible discs, said two solid members being located between the flexible discs in overlapping relationship with each other axially of the coupling thereby to shorten the drive coupling.

4 Claims, 8 Drawing Figures

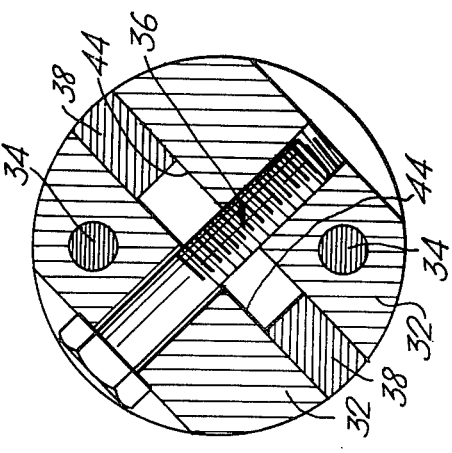
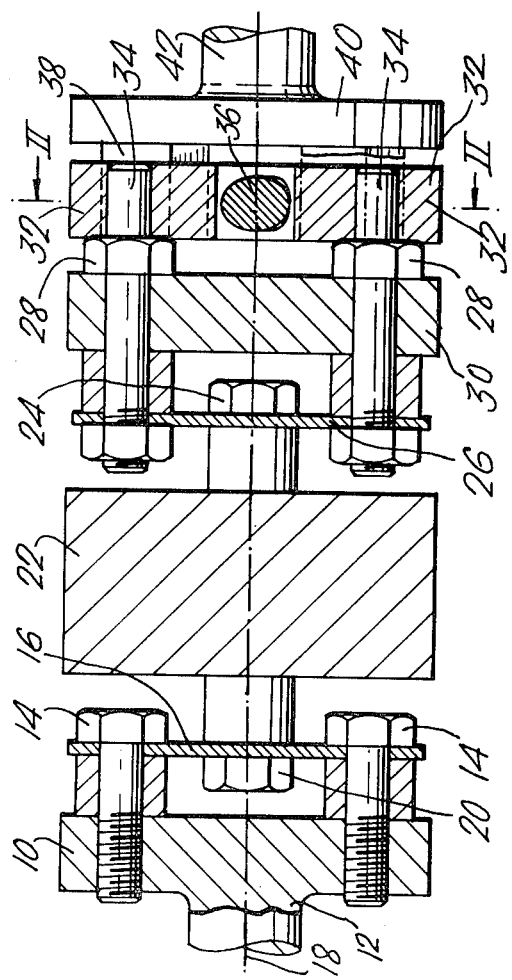

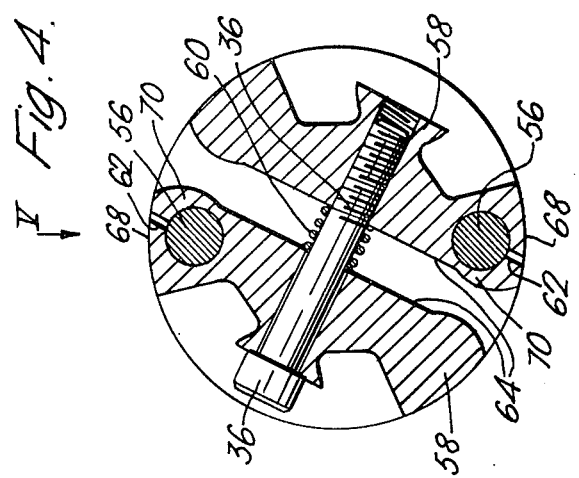
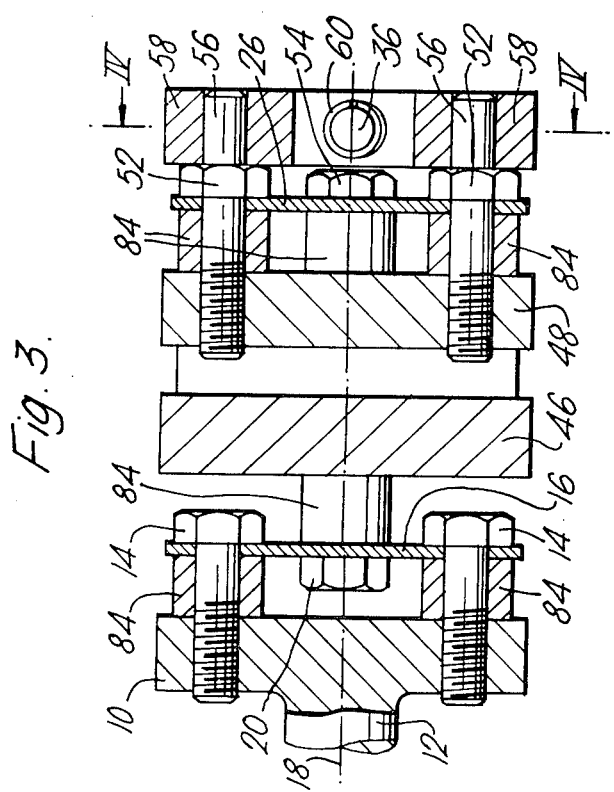

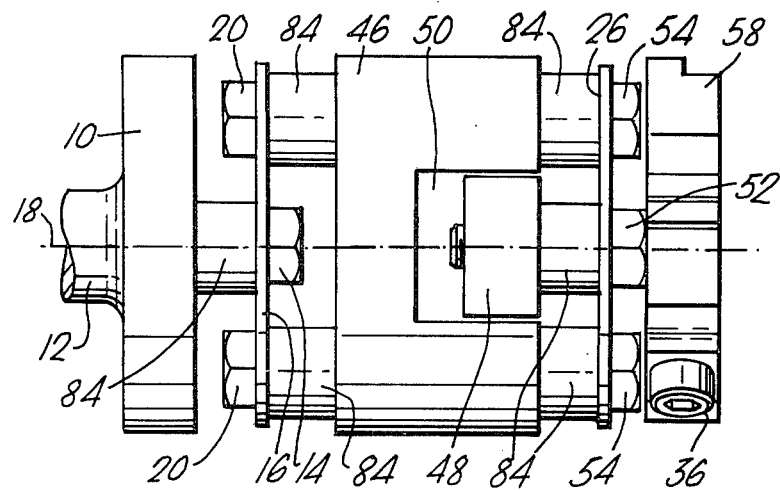
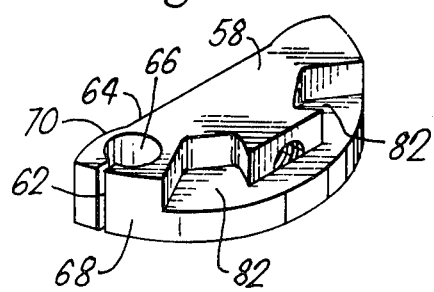

DRIVE COUPLING

This is a continuation, of application Ser. No. 162,663, filed June 24, 1980, now abandoned.

BACKGROUND OF THE INVENTION

This invention relates to drive couplings, and is especially (but not exclusively) concerned with readily-disconnectable drive couplings for connecting a drive shaft in or on a fuel injection pump test machine to the driven shaft of a fuel injection pump under test on the machine.

It is already known in such test machines to use a drive coupling which provides for some measure of lateral flexibility while, at the same time, ensuring torsional stiffness. The reason why lateral flexibility is desirable is that the drive shaft on the test machine and the driven shaft of the fuel injection pump under test are frequently slightly misaligned laterally or are angularly out-of-line, usually because the person carrying out the test is not able to get the two shafts absolutely in alignment with each other when clamping or otherwise fixing the fuel injection pump on the test machine. By way of illustration, a typical drive coupling hitherto used in such test machines is shown in FIGS. 1 and 2 of the accompanying drawings, and this prior coupling will now be described. FIG. 1 shows the coupling in vertical section, while FIG. 2 is a section taken on the line II—II in FIG. 1.

For ease of description, the elements of the coupling will be stated in the order of drive input to drive output, i.e. from left to right in FIG. 1. It thus comprises a plate 10 having a shaft 12 for connection to the shaft of an electric drive motor or other prime mover in a fuel injection pump test machine. The plate 10 is connected by two bolts or screws 14 to a relatively thin flexible disc 16 arranged transversely of the rotational axis 18 of the shaft 12, the bolts 14 being angularly spaced by 180°. Two further bolts 20 angularly spaced at 90° to the two bolts 14 connect the disc 16 to an intermediate solid member 22. Another two bolts 24 at the same angular positions about the drive axis 18 as the two bolts 20 join the intermediate member 22 to a second relatively thin flexible disc 26. Two further bolts 28 at the same angular positions as the bolts 14 connect the disc 26 to a second solid member 30. Two clamping jaws 32 swivel on two pins 34 protruding from the solid member 30, the two pins 34 being formed as integral extensions of the bolts 28. The jaws 32 lie one on either side of the drive axis 18 and are brought towards each other by means of a transverse bolt 36 passing through each jaw. The jaws are adapted to clamp onto two drive dogs 38 forming part of an injection pump driven member 40 having a shaft 42.

As each of the two thin discs 16, 26 is relatively free to bend in planes at right angles to each pair of bolts 14, 20; 24, 28, the discs have conical flexibility whilst remaining relatively stiff torsionally. The end effect is that the coupling can accommodate either angular out-of-line shafts or laterally misaligned shafts whilst ensuring high torsional stiffness. In addition, the jaws 32 offer the facility of rapid connection of the coupling to the article to be driven (in this case the shaft of a fuel pump on a fuel injection pump test machine).

SUMMARY OF THE INVENTION

The above-described coupling has, however, certain disadvantages. Thus, in order to give sufficient lateral flexibility, the spring discs must be spaced a sufficient distance apart so as not to become over-stressed in bending when allowing for a specific amount of malalignment of the shafts. This makes the coupling inconveniently long. Furthermore, the jaws 32, having flat interacting surfaces 44, only lend themselves to clamping rectangular-shaped dogs 38 on the driven member 40. As there are many driven members in use which have dogs of other shapes not suitable for being driven by flat jaws, the coupling is of restricted application. Finally, backlash is frequently encountered in the coupling because of the torsional free movement occasioned by the clearance which must exist between the pins 34 on which the jaws 32 swivel and the pin-receiving holes in the jaws.

It is therefore the aim of the present invention to prevent such backlash, to shorten the coupling, and to provide jaws capable of driving a wider variety of driven members.

From one aspect, the invention is directed to a drive coupling incorporating at least one flexible disc and a pair of jaws for clamping dogs on a driven member, the jaws being mounted for limited pivotal movement on respective pins which are received in corresponding holes in the jaws, in which slots break into the said holes from the peripheral surfaces of the jaws so that, when the jaws are tightened onto the dogs of a driven member, any clearance between the pins and the holes is taken up, and backlash between them is obviated.

From another aspect, the invention is directed to a drive coupling having two spaced-apart flexible discs and two solid members connected to those discs, in which the two solid members are located between the discs and overlap each other axially of the coupling so as to shorten the coupling.

The invention also extends, in a third aspect, to a drive coupling comprising a pair of jaws for clamping dogs on a driven member, in which the dog-engaging surfaces of the jaws are of curved convex shape so as to be capable of gripping dogs having concave surfaces as well as dogs of rectangular shape.

An example of a drive coupling in accordance with the invention is shown in FIGS. 3 to 8 of the accompanying drawings.

BRIEF DESCRIPTION OF THE DRAWINGS

FIG. 1 is a cross-section of a prior art coupling.
FIG. 2 is a section along line II—II of FIG. 1.
FIG. 3 is a vertical section similar to FIG. 1;
FIG. 4 is a section taken on the line IV—IV in FIG. 3;
FIG. 5 is a plan view along the arrow V in FIG. 4;
FIG. 6 is a perspective view of one of the jaws shown in FIG. 4.

DETAILED DESCRIPTION OF THE INVENTION

Figure 7:
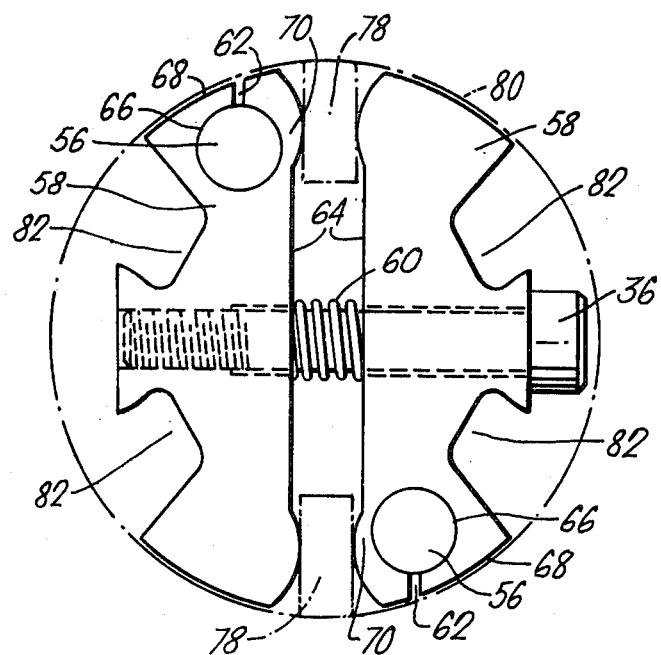
FIG. 7 is an enlarged version of FIG. 4 showing the jaws gripping two rectangular-shaped dogs of a driven member.

The drive coupling shown in FIGS. 3 to 6 is designed, like that shown in FIGS. 1 and 2, to couple the drive shaft of an electric motor or other prime mover on or in a fuel injection pump test machine to the driven shaft of a fuel injection pump under test. It is to be understood, however, that the coupling of FIGS. 3 to 6 is not restricted to such use, but can be applied to any installation or equipment where a readily-releasable coupling providing lateral flexibility with torsional stiffness is called for.

Certain parts shown in FIGS. 3 to 6 are substantially identical to corresponding parts shown in FIGS. 1 and 2, and the same reference numerals have therefore been used for them. It will be seen, however, that the two spaced-apart flexible discs 16 and 26 in FIG. 3 are bolted to solid members 46 and 48 which are differently shaped from the solid members 22 and 30 shown in FIG. 1 and which are both located between the discs and overlap one another in an axial direction. To permit such overlap, the solid member 46 has a deep transversely-extending groove 50 formed in it (see FIG. 5), while the solid member 48 is shaped as a rectangular elongate bar which is received with ample clearance wholly within the groove 50. A pair of bolts or screws 52 at the same angular position as the bolts or screws 14 secure the second flexible disc 26 to the solid member 48, the latter being provided with screw-threaded holes for this purpose. In a similar way, a pair of bolts or screws 54 at the same angular position as the bolts or screws 20 secure the flexible disc 26 to the first solid member 46. To receive the bolts or screws 20 and 54, the solid member 46 has screw-headed bore holes (not shown) in it.

Like the bolts 28 in FIG. 1, the bolts or screws 52 have extensions 56 serving as pins on which a pair of clamping jaws 58 are mounted for limited pivotal movement. The jaws 58 are movable towards and away from each other by rotation of a transverse bolt 36, as in the coupling of FIGS. 1 and 2. To urge the jaws apart, a coiled compression spring 60 surrounds the mid-portion of the bolt 36 (see FIGS. 7 and 8).

The coupling shown in FIGS. 3 to 8 has three important advantages over that shown in FIGS. 1 and 2.

In the first place, the length of the coupling is substantially reduced by locating the second solid member 48 upstream of the second flexible disc so that both it and the first solid member 46 lie between the two discs 16 and 26. This feature diminishes the overall length of the coupling because the space required for the second solid member 48 (which space, in the coupling of FIGS. 1 and 2, contributes to coupling length) is now sited between the flexible discs and does not contribute to coupling overall length, especially as the second solid member 48 is received wholly within the groove 50 in the first solid member 46.

A second advantage of the coupling shown in FIGS. 3 to 8 is that torsional free movement or backlash between the pins 56 and the jaws 58 is obviated by providing slots 62 substantially parallel with the abutment faces 64 of the jaws and breaking into the drive pin holes 66 in the jaws from the peripheral surfaces 68. This permits the tension in the jaw clamping bolt 36 to deflect the jaws in the regions 70 of the jaws so as to take up the clearance between the pins 56 and the holes 66 in the jaws.

Figure 8:
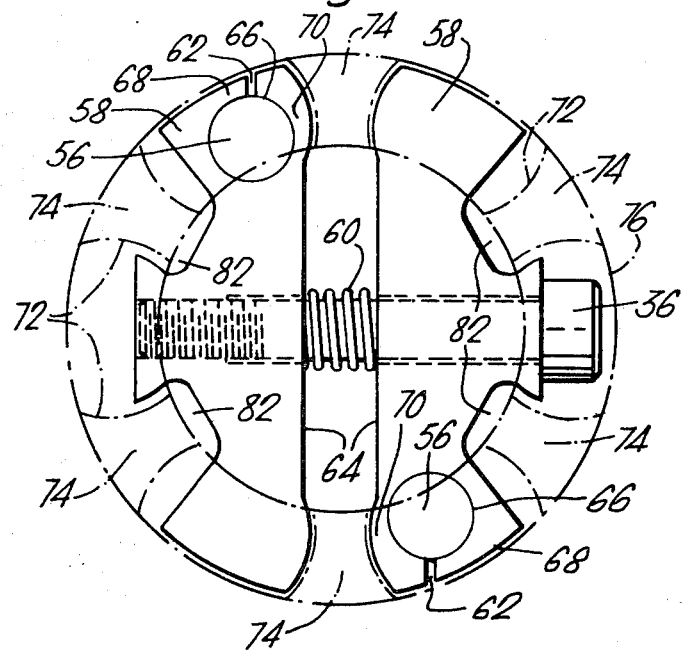
FIG. 8 is a view similar to FIG. 7 showing the jaws gripping two of six concave-surfaced dogs on a driven member.

The third advantage given by the coupling of FIGS. 3 to 8 is that, as shown in FIG. 8, the shape of the jaws is such that they can clamp the concave cylindrically-shaped surfaces 72 of the dogs 74 provided on a six-dog Simms coupling 76 whilst at the same time remaining suitable for clamping rectangular-shaped dogs 78 of a pump driven member 80 as shown in FIG. 7. Of the six dogs 74 shown in FIG. 8, two opposing dogs are clamped between the jaws 58, while the remaining four are received, with clearance, in recesses 82 in the jaws.

Preferably care is taken to give the coupling, as a whole, a substantially cylindrical outline shape (see FIG. 5) so as to avoid the presence of projections which could be dangerous when the coupling is rotating.

Use is made in the coupling of spacing sleeves 84 which surround the bolts or screws 14, 20, 52 and 54. If desired, however, these spacing sleeves could be replaced by projections on the plate 10 and the member 48 in FIG. 3, and on the members 46 and 48 in FIG. 5.

We claim:

1. A drive coupling for connecting a drive shaft to a driven shaft, said coupling being constructed to lie in an axial gap between the two shafts and comprising:
   (a) a first flexible disc connected by a first pair of connecting bolts to means on one of said shafts;
   (b) a first solid member spaced from said first flexible disc and connected thereby to a second pair of connecting bolts, said second pair of connecting bolts being at different angular positions to said first flexible disc with respect to said first pair of connecting bolts, and said first solid member having a transversely-extending groove therein;
   (c) a second flexible disc spaced from said first solid member and connected thereto by a third pair of connecting bolts, said third pair of connecting bolts being at the same angular positions as said second pair of connecting bolts, and said second flexible disc being disposed on that side of said first solid member remote from said first flexible disc;
   (d) a second solid member spaced from said second flexible disc and connected thereto by a fourth pair of connecting bolts, said fourth pair of connecting bolts being at the same angular positions as said first pair of connecting bolts, and said second solid member being shaped as a bar which is received within said transversely-extending groove of said first solid member to permit sufficient relative movement between said first and second solid members to allow said flexible discs to flex; and
   (e) a pair of jaws connected to said fourth pair of connecting bolts on that side of said second flexible disc remote from said second solid member, said pair of jaws being adapted to clamp onto dogs associated with the other one of said two shafts.

2. A drive coupling according to claim 1, in which the jaws are pivotally-mounted and are provided with slots which break into holes arranged to receive pivot pins for the jaws so that, when the jaws are tightened onto said dogs, any clearance between the pins and said holes is taken up whereby backlash between the pins and the holes is avoided.

3. A drive coupling according to claim 2, in which the slots in the jaws lie substantially parallel with opposed abutment faces on the jaws.

4. A drive coupling according to claim 1, in which the jaws have portions forming dog-engaging surfaces of curved convex shape so as to enable the jaws to grip dogs having concave surfaces as well as dogs of rectangular shape.

* * * * *